United States Patent [19]
Gomi

[11] 4,394,949
[45] Jul. 26, 1983

[54] PIN WHEEL FEED MECHANISM

[75] Inventor: Yoshifumi Gomi, Shiojiri, Japan

[73] Assignees: Epson Corporation, Nagano; Kabushiki Kaisha Suwa Seikosha, Tokyo, both of Japan

[21] Appl. No.: 253,971

[22] Filed: Apr. 13, 1981

[30] Foreign Application Priority Data

Apr. 15, 1980 [JP] Japan .............................. 55-51128[U]

[51] Int. Cl.[3] .............................................. G03B 1/24
[52] U.S. Cl. .......................................... 226/76; 226/82
[58] Field of Search ........................ 226/76, 79, 82, 83, 226/84, 85, 190; 271/275

[56] References Cited

U.S. PATENT DOCUMENTS

| | | | |
|---|---|---|---|
| 2,683,599 | 7/1954 | Davidson et al. | 226/79 |
| 3,549,068 | 12/1970 | Calano | 226/79 |
| 3,838,804 | 10/1974 | Bonafino | 226/76 |
| 4,022,365 | 5/1977 | Weller | 226/81 |
| 4,197,969 | 4/1980 | Sasaki | 226/79 |
| 4,227,821 | 10/1980 | Plaza et al. | 226/76 X |
| 4,251,162 | 2/1981 | Kammerer et al. | 226/76 X |

FOREIGN PATENT DOCUMENTS

| | | | |
|---|---|---|---|
| 830293 | 3/1960 | United Kingdom | 226/76 |

*Primary Examiner*—Stuart S. Levy
*Assistant Examiner*—Scott J. Haugland
*Attorney, Agent, or Firm*—Blum, Kaplan, Friedman, Silberman & Beran

[57] ABSTRACT

A pin wheel feed mechanism for transporting documents having feed perforations along the marginal edges thereof. The mechanism includes a pair of symetrically constructed guide frames, each adapted for use on either marginal edge of the feeding document. A pin wheel is rotatably housed in each guide frame and includes a plurality of equiangularly spaced pins which project radially from the surface of each wheel for feeding the document. A notch is provided between each pair of adjacent pins to accommodate warps in the marginal edges of the document to insure positive feed.

10 Claims, 6 Drawing Figures

PIN WHEEL FEED MECHANISM

BACKGROUND OF THE INVENTION

This invention is directed to a pin wheel feed mechanism suitable for use in a printer and like equipment, and, in particular, to a paper feed mechanism of the pin-feed type for transporting documents having perforations along the peripheral edges thereof.

Various constructions of pin-feed type paper transporting devices are known in the art. An example of such a device is described in U.S. Pat. No. 4,227,821 to Plaza et al. Although the drive mechanism disclosed in the Plaza et al. patent is alleged to be relatively simple in construction and low in cost compared with other pin-feed type devices, the paper transporting device of Plaza et al. is still complicated in construction and has a high manufacturing cost due to the fact that the mechanism disclosed therein requires a substantially large number of parts which in turn requires a complex assembly operation.

Additionally, although conventional pin-feed type paper transporting devices can operate reasonably well when the sheet or paper to be transported is sufficiently thin as compared with the height of the pins on the pin wheels which feed the paper through the device, the operation of these prior art devices becomes unreliable when a relatively thick sheet or a sheet having several layers of paper are to be transported through the mechanism. For example, many types of webs having perforations along their edges include an outer sheet and inner carbon sheets which allow printing on several pages at the same time. In this case, the engagement of the pins with the perforations on the periphery of the sheet becomes unreliable due to the presence of warps or bunched portions between adjacent pins where the several sheets of paper are joined together. This is particularly the case when the several sheets of joined paper move through the curved path defined by the surface of the pin wheel. These warps or bunches may cause the feeding paper to be pushed off of the pin wheel. Conventional pin wheels of the type discussed herein are disclosed in the Plaza et al. U.S. Pat. No. 4,227,821 and the Weller U.S. Pat. No. 4,022,365.

Accordingly, a pin feed mechanism which is simply constructed and inexpensive to manufacture with a concurrent reduction in the number of working parts which includes a pin wheel construction which avoids the disadvantages of the prior art pin wheels by making provision for warps in layered or thick feeding sheets, is desired.

SUMMARY OF THE INVENTION

Generally speaking, in accordance with the invention, a pin wheel feed mechanism constructed to overcome disadvantages inherent in connectional pin-feed mechanisms, is provided. A pin wheel feed mechanism constructed in accordance with the invention includes a pair of symetrically constructed guide frames slidably supported on a support shaft so that the distance between the frames can be adjusted to conform to different document widths. A pair of pin or sprocket wheels are rotatably supported on a drive shaft spaced from the support shaft. A pin wheel is housed in each guide frame when the mechanism is operative.

The pin wheels include a plurality of equiangularly spaced pins which extend radially from the surface of the wheels and successively project through a slot in the guide frames. A notch is provided between each pair of adjacent pins on the wheels. The notches accommodate warps or bulges in the edges of the feeding document.

The invention is particularly useful where a thick document or a document having several layers of paper are to be transported by the device. The pin wheel feed mechanism described herein is constructed from a relatively few number of parts and therefore is inexpensive to manufacture.

Accordingly it is an object of this invention to provide an improved paper feed mechanism having a simple construction.

Another object of the invention is to provide an improved paper feeding mechanism of the pin-feed type which includes a relatively small number of parts as compared with prior devices.

Still another object of the invention is to provide an improved pin wheel construction.

Yet another object of the invention is to provide an improved pin wheel construction for a paper feed mechanism of the pin-feed type which includes a notch or indentation between adjacent projecting pins for compensating for warps in multi-layered or thick feeding paper.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompany drawings, in which.

DESCRIPTION OF THE PREFERRED EMBODIMENTS

Figure 1:
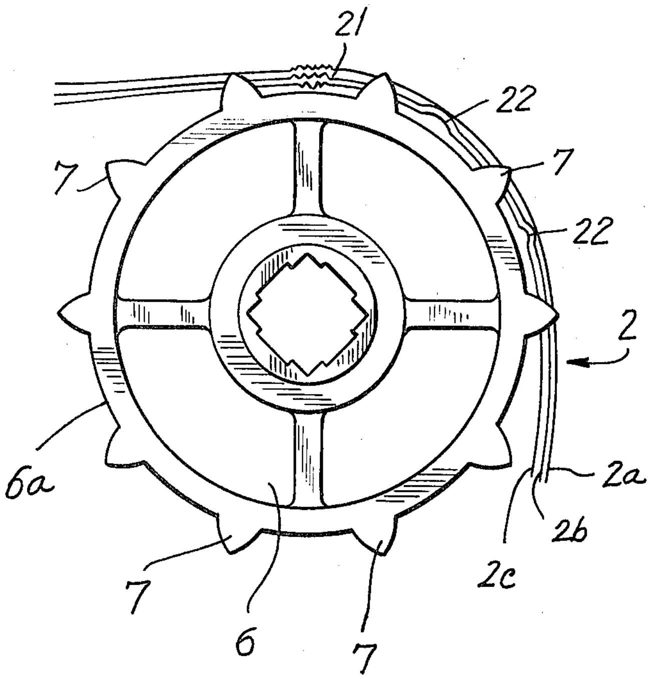
FIG. 1 PRIOR ART
FIG. 1 is an elevational view of a pin wheel constructed in accordance with the prior art shown transporting a multi-layered sheet.

Reference is first made to FIG. 1, wherein a pin wheel 6, constructed in accordance with the prior art is depicted. Pin wheel 6 is circular in shape and includes an outer surface 6*a* from which a plurality of pins 7 extend. Pins 7 are spaced equiangularly around the outer surface of pin wheel 6.

In operation, pins 7 on pin wheel 6 engage perforations along the periphery or marginal edges of a sheet 2 to be transported. Sheet 2 may include a plurality of layers of paper shown as 2a, 2b and 2c joined together at 21 in FIG. 1. Such a plurality of layers would be utilized where there is a cover sheet 2a and copy sheets 2b and 2c below. As the edge of multi-layered sheet 2 is fed by pin wheel 6, the sheets will tend to warp, gather or bulge at portion 22 depicted in FIG. 1 due to the curvilinear surface of pin wheel 6. This may force sheet 2 off of pin wheel 6 thereby making a proper feed particularly difficult and unreliable.

Figure 2:
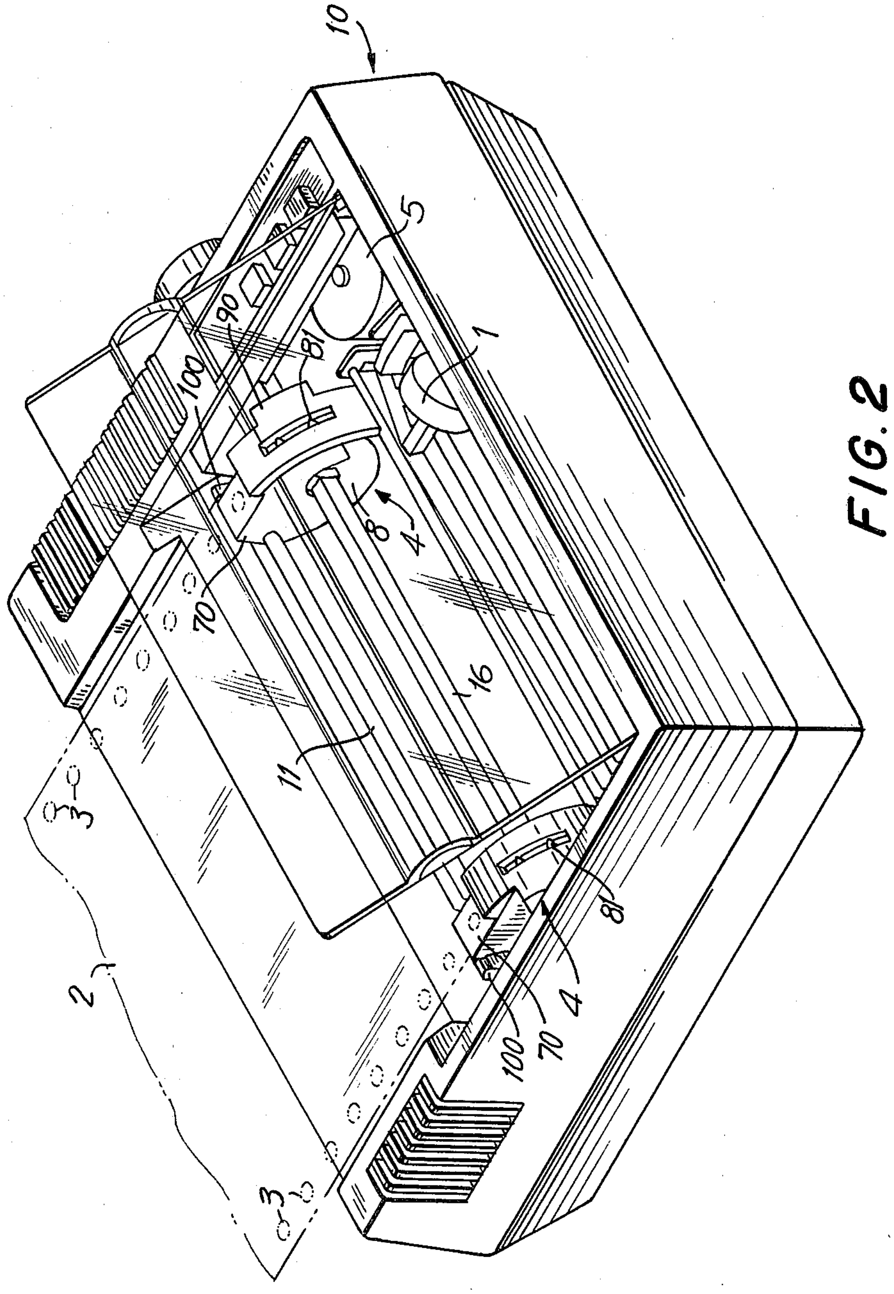
FIG. 2 is a perspective view of a printer having a paper feed mechanism constructed in accordance with the present invention.

Reference is now made to FIG. 2 wherein a printing mechanism, generally indicated as 10, includes a paper feed mechanism constructed in accordance with the present invention, generally indicated as 4. A paper or sheet 2 is advanced or transported by mechanism 4 so that printing head 1 can print successive lines on paper 2. Paper 2 is adapted to be fed by two rows of feeding perforations 3 formed on opposite peripheral portions thereof by paper feeding mechanism 4. Paper feeding mechanism 4 includes a drive shaft 16 which is selectively driven by a motor 5 so that paper 2 can be selectively fed through printer 10.

Figure 3A:
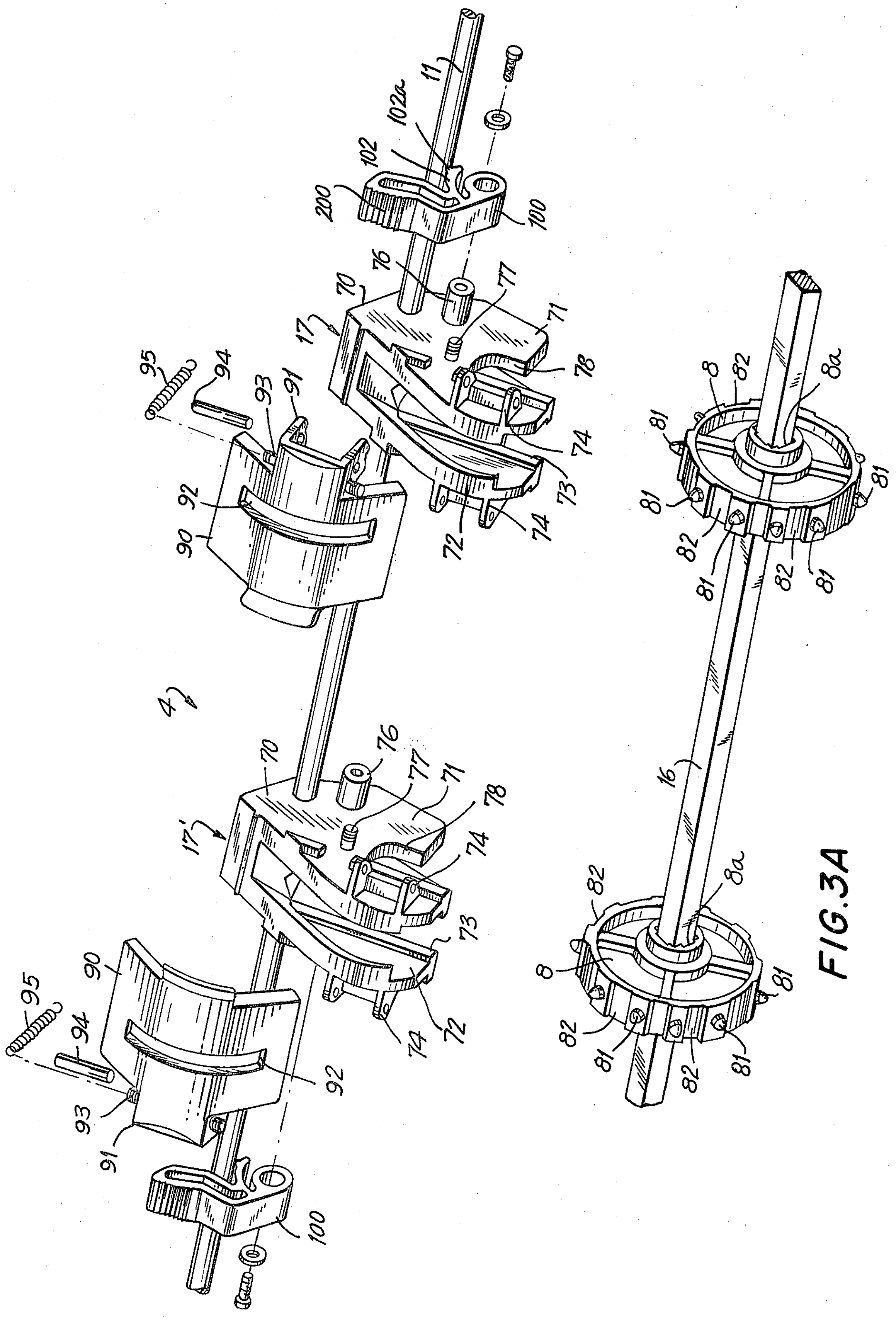
FIG. 3A is an exploded perspective view of a paper feed mechanism constructed in accordance with the present invention.
Figure 3C:
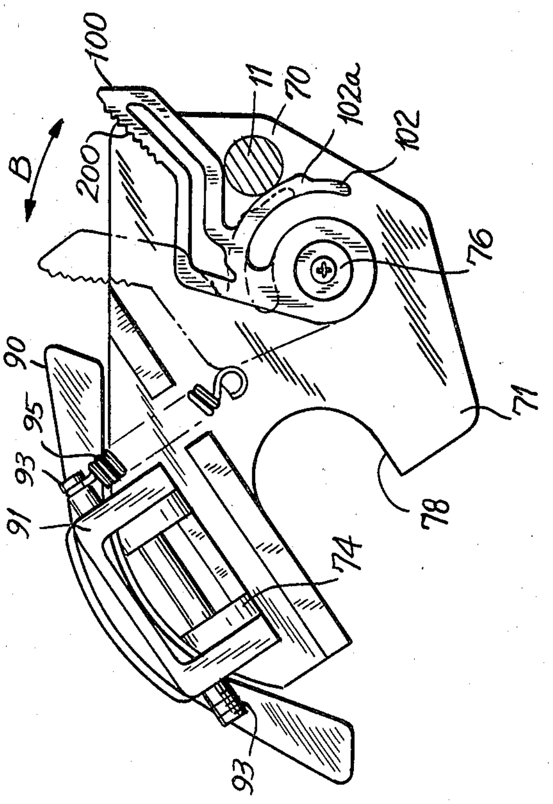
FIG. 3C is an elevational side view of the guiding device depicting the operation of the stopping lever.
Figure 3B:
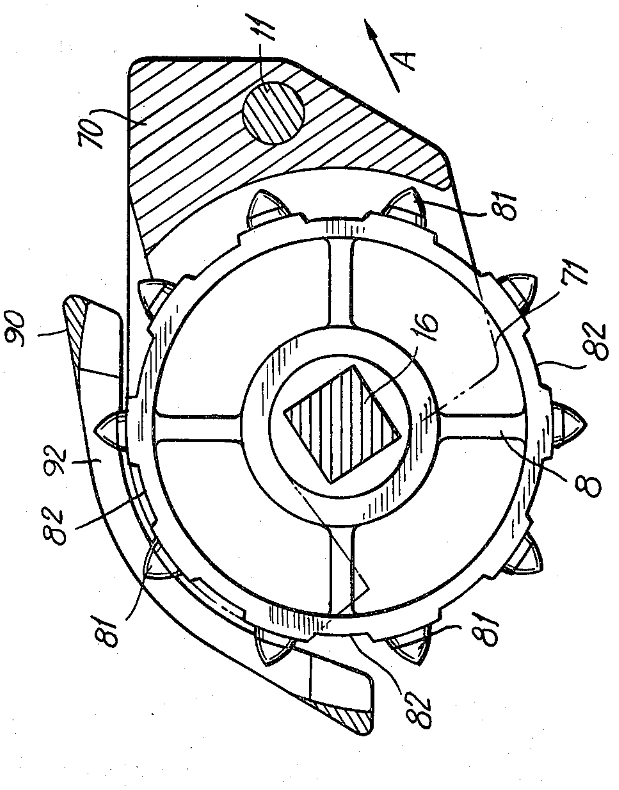
FIG. 3B is a partial cross-sectional view of the pin wheel and guiding device depicted in FIG. 3A shown in an operational position.

Referring now to FIGS. 3A, 3B and 3C, the structural details of paper feeding device 4 will be described in detail. Feeding device 4 includes a pair of identically constructed pin wheels 8 which are slidably secured on drive shaft 16 so that the distance therebetween can be adjusted to correspond to the width of the document to be fed by mechanism 4. Pin wheels 8 are adapted to be rotated by drive shaft 16, for example, by providing a square drive shaft 16 and corresponding square openings 8a in the center of wheels 8. A pair of identically constructed paper guide frames 17 and 17′ are slidably supported on a support shaft 11.

Shaft 11 extends parallel to drive shaft 16, as best depicted in FIG. 2, and is selectively movable with respect thereto as indicated by arrow A in FIG. 3B between a setting position and an operating position. In the setting position, the paper guide members 17 and 17′ are spaced from the wheels 8 on drive shaft 16. Since guide frames 17 and 17′ are identically constructed, reference will only be made to frame 17.

Pin wheel 8 includes a plurality of equiangularly spaced pins 81 on the peripheral surface thereof which extend radially therefrom. A notch or indentation 82 is provided between each adjacent pair of pins 81.

Guide member 17 includes a generally U-shaped base 70, a cover guide plate 90 and a position selector lever 100. The generally U-shaped base member 70 has a pair of side plates 71 and 72 which are connected to each other at the rear portions thereof and which define a space 73 therebetween for receiving pin wheel 8 when in the closed position. Base member 70 is preferably formed from a plastic material by molding or the like. Side plates 71 and 72 are identical in structure and therefore only the construction side plate 71 will be described.

On the outer surface of side plate 71, a stud 76 and a hinge 74 are formed integrally therewith. Position selector lever 100 is rotatably supported on stud 76. Side plate 71 is formed with a cutout portion 78 for receiving drive shaft 16 so that pin wheel 8 can be received in space 73 without obstruction when shaft 11 is set in the operative position as depicted in FIG. 2.

A cover plate 90 has a hinge 91 formed integrally therewith which is adapted to be coupled to hinge 74 on side plate 71 of base member 70 by means of a hinge pin 94. A spring 95 is connected at one end to a stud 77 on side plate 71 and at its other end to a stud 93 provided on opposite sides of hinge 91 of cover plate 90 so that cover plate 90 can be moved between an open position and a closed position on either guide member 17 or 17′. Cover plate 90 is formed with a slot 92 so that when a shaft 11 is put into its operative position and cover plate 90 is moved into the closed position after the marginal edge of the paper is positioned on pin wheel 8, movement of pins 81 will not interfere with cover plate 90.

Selector lever 100 is rotatably mounted on stud 76 on side plate 71 and includes a thumb portion 200 and a resilient catch 102 engageable with shaft 11 for holding guide member 17 at a desired position along shaft 11. In the embodiment described, catch portion 102 is in the form of a lever having a protrusion 102a near the end thereof. Lever 100 is engageable with shaft 11 by pushing thumb portion 200 toward shaft 11 as best depicted in FIG. 3C, the motion of lever 100 being indicated by arrow B in FIG. 3C. When lever 100 is so engaged, guide members 17 or 17′ can be fixed at a desired position along shaft 11 according to the width of the sheet 2. Engagement is maintained by protrusion 102a near the end of catch portion 102, which engages the lower side of shaft 11 and holds guide member 17 in place.

As aforenoted, base members 17 and 17′ are identically constructed so that either one can be used on either side of perforations 3 for feeding paper 2. An operator need merely select the appropriate side plate portions 71 or 72 to which to connect selector lever 100 and cover plate 90.

This construction of paper guide member 17 including base member 70, cover plate 90 and selector lever 100 makes it possible to construct the paper feed mechanism of the present invention with a fewer number of parts than previously required by the prior art device. This is due to the use of a pair of identical guide members 17 as well as a pair of identical pin wheels 8. This has proven very effective in improving the manufacturing efficiency of the mechanism.

Pin wheels 8 are preferably formed of a suitable plastic material. Pin wheels 8 are driven by drive shaft 16 either continuously or intermitently so as to feed recording paper 2 through a printer or like device.

Figure 4:
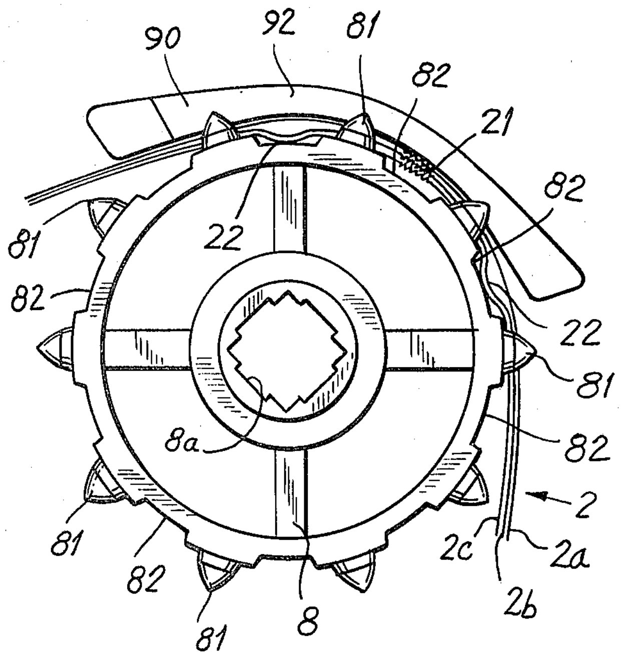
FIG. 4 is a side elevational view of the pin wheel constructed in accordance with the present invention shown transporting a multi-layered sheet.

Each pin wheel 8 has formed on the peripheral surface thereof, a plurality of equiangularly spaced pins 81 and a plurality of notches or indentations 82, one of which is located between each two adjacent pins 81. This construction is especially desirable where the recording sheet 2 is composed of a plurality of sheets 2a, 2b and 2c which are joined by providing a plurality of suitably spaced gathered portions 21 along sheet 2 as depicted in FIG. 4.

If such a recording sheet 2 having multiple layers were to be fed conventional pin wheels which do not include notches between adjacent pins, the outer or cover sheet 2a would tend to be pushed outwardly by warps, gathers or bunches 22 of inner sheets 2b and 2c due to the difference in curvilinear path traveled by each such layer causing perforations 3 on the outer sheet to disengage from the pins and resulting in unreliable and inefficient transportation of the sheet.

By utilizing pin wheels 8 constructed in accordance with the present invention, warps 22 of inner papers 2b and 2c of the multi-layered recording sheet 2 fall within the notches 82 and therefore the sheet has no tendency to disengage from pins 81 on the peripheral surface of pin wheel 8. Accordingly, a multi-layered or thick sheet can be transported reliably by the present invention.

As described herein, the paper feed mechanism according to the present invention can be constructed from a relatively small number of parts each formed from a suitable plastic material. In particular, since the pin wheels and guide frames are supported by separate shafts, the assembly thereof is quite simple. Therefore, the document transporting mechanism according to the present invention can be manufactured at a relatively low cost. Furthermore, by providing notches between adjacent pins on the peripheral surface of the pin wheel, the sheet can be transported reliably without disengagement from the pins even if the sheet bulges between the pins.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A feed mechanism for transporting documents having perforations along the marginal edges thereof, comprising a support shaft, a pair of guide frames slidably supported on said support shaft, a drive shaft spaced from said support shaft, a pair of sprocket wheels slidably supported on said drive shaft and adapted for rotation therewith, one said sprocket wheel being housed in each said guide frame, each said sprocket wheel having a plurality of pins equiangularly spaced around the periphery thereof for successive engagement with the perforations on said documents for feeding said documents, said documents becoming bunched between adjacent pins on said sprocket wheel as said documents are fed, each said wheel having a notch between each pair of adjacent pins, said bunched portions of said documents lying within said notches so that disengagement of said documents from said sprocket wheels is prevented.

2. The feed mechanism, as claimed in claim 1, wherein each said guide frame includes two side plates defining a space therebetween for receiving said sprocket wheel.

3. The feed mechanism, as claimed in claim 2, wherein each said side plate includes cut-outs for receiving said drive shaft.

4. The feed mechanism, as claimed in claim 2, wherein each said guide frame includes a cover plate hingedly secured to one of said side plates, said document traveling between said cover plate and said side plates.

5. The feed mechanism, as claimed in claim 4, wherein each said cover plate includes a slot for permitting said pins to successively extend therein.

6. The feed mechanism, as claimed in claim 5, wherein each said guide frame includes locking means for selectively locking said guide frames to said support shaft.

7. The feed mechanism, as claimed in claim 6, wherein said locking means includes a lever rotatably supported on one said side plate on each said guide frame, said lever being selectively frictionally engageable with said support shaft.

8. The feed mechanism, as claimed in claim 7, wherein said cover plate is biased to said side plate between open and closed portions.

9. The feed mechanism, as claimed in claim 7, wherein said support shaft is movable with respect to said drive shaft between operative and setting positions.

10. A feed mechanism for transporting documents having perforations along the marginal edges thereof, the improvement comprising a pin wheel having a plurality of equiangularly spaced pins which project radially from the surface of said wheel rotatably supported on said feed mechanism, said pins successively engaging in said perforations in said documents as said pin wheel rotates, the engagement of said perforations with said pins creating bunched portions of said documents between adjacent pins as said documents are fed, said wheel having a notch formed in the surface thereof between each pair of adjacent pins, said bunched portions of said documents projecting in said notches to prevent disengagement of said perforations from said pins.

* * * * *